United States Patent [19]

Moriyama et al.

[11] 4,448,035
[45] May 15, 1984

[54] AIR CONDITIONER CONTROL SYSTEM

[75] Inventors: Masakazu Moriyama; Takao Saito; Akinori Ido; Takeo Matsushima; Hisao Hara, all of Aichi, Japan

[73] Assignee: Toyota Jidosha Kogyo Kabushiki Kaisha, Toyota, Japan

[21] Appl. No.: 367,906

[22] Filed: Apr. 13, 1982

[30] Foreign Application Priority Data

Apr. 20, 1981 [JP] Japan .................. 56-60293

[51] Int. Cl.³ .................. F25D 17/04; B60H 3/00
[52] U.S. Cl. .................. 62/176.6; 62/231; 98/2.01; 165/43
[58] Field of Search .................. 62/180, 176 E, 231; 165/12, 24, 27, 43; 236/49; 98/2.01

[56] References Cited

U.S. PATENT DOCUMENTS 4,358,050 11/1982 Naganoma et al. .............. 236/49 X
4,381,074 4/1983 Iijima et al. .............. 165/43

Primary Examiner—William E. Wayner
Attorney, Agent, or Firm—Kenyon & Kenyon

[57] ABSTRACT

A plurality of control modes set in consideration of the comfortability in a compartment of a vehicle are previously stored in a memory medium, such as a magnetic card, and programs of the compressor control, the recirculation/fresh air change-over control, the blow-out opening change-over control, the air flow rate control, the condensation prevention control and the like which are preset in a central processing unit are performed in accordance with the data of the aforesaid memory medium. Output signals from sensors provided at various portions of the vehicle or instructions by the operator, and various controls concerning the air conditioner are automatically performed without requiring manual operations. The controls can be effected through any one of a speech recognition device, sensors, external components and manual operations.

11 Claims, 24 Drawing Figures

F I G. 18
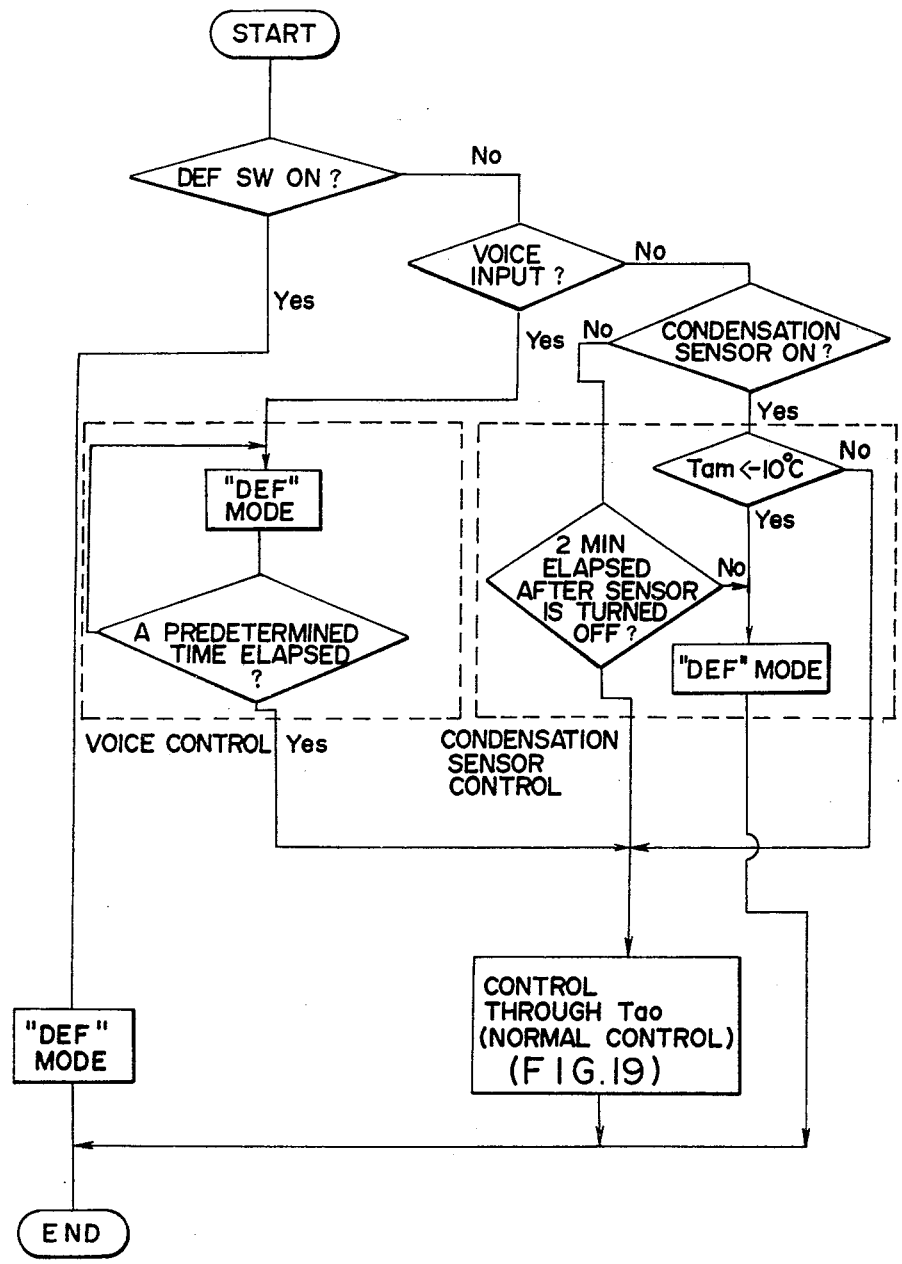

AIR CONDITIONER CONTROL SYSTEM

BACKGROUND OF THE INVENTION

1. Field of the Invention

This invention relates to an air conditioner control system capable of automatically effecting a variety of control modes through computer control.

2. Description of the Prior Art

Air conditioners can be provided in vehicles such as motor cars, and the provision of an air conditioner makes it possible to effect ventilation, air cooling and the like as necessary. In the conventional air conditioners, various operations including selection of the modes, regulating the air flow rate, air cooling and the like are all performed by manual operations. Consequently, the operations have been troublesome to perform, and moreover, when a driver is engaged in the operation of the air conditioner, there is produced a possible driving hazard.

SUMMARY OF THE INVENTION

The present invention has as its object the provision of an air conditioner control system capable of eliminating the manual operation of an air conditioner and improving the comfortability through the adoption of control mode data input means and computer control.

According to the present invention, the input/output (I/O hereinafter) systems are all operated through a computer, and moreover, various controls are effected automatically by means of a magnetic card (which is replaceable by a magnetic tape, a punch card or the like) and may be effected by manual operation. When a magnetic card is used in the data input operation, such data are included as being capable of controlling specific modes other than the normal control and controlling other peripheral components.

BRIEF DESCRIPTION OF THE DRAWINGS

FIG. 18 is a process flow chart of the blow-out opening control;

DETAILED DESCRIPTION OF THE INVENTION

According to the present invention, the following controls for the air conditioning will be studied.

(a) The basic temperature control
(b) The air mixture (A/M hereinafter) damper opening control
(c) The water valve control
(d) The compressor control
(e) The recirculation/fresh air control
(f) The blow-out opening change-over control
(g) The flow rate control
(h) The condensation prevention control (for the condensation prevention in the front and rear windows)
(i) The air purification (A/P hereinafter) control
(j) The precontrol.

Before explaining the specific controls, description will be given of the arrangement of the system for working the above-described control.

Figure 1:
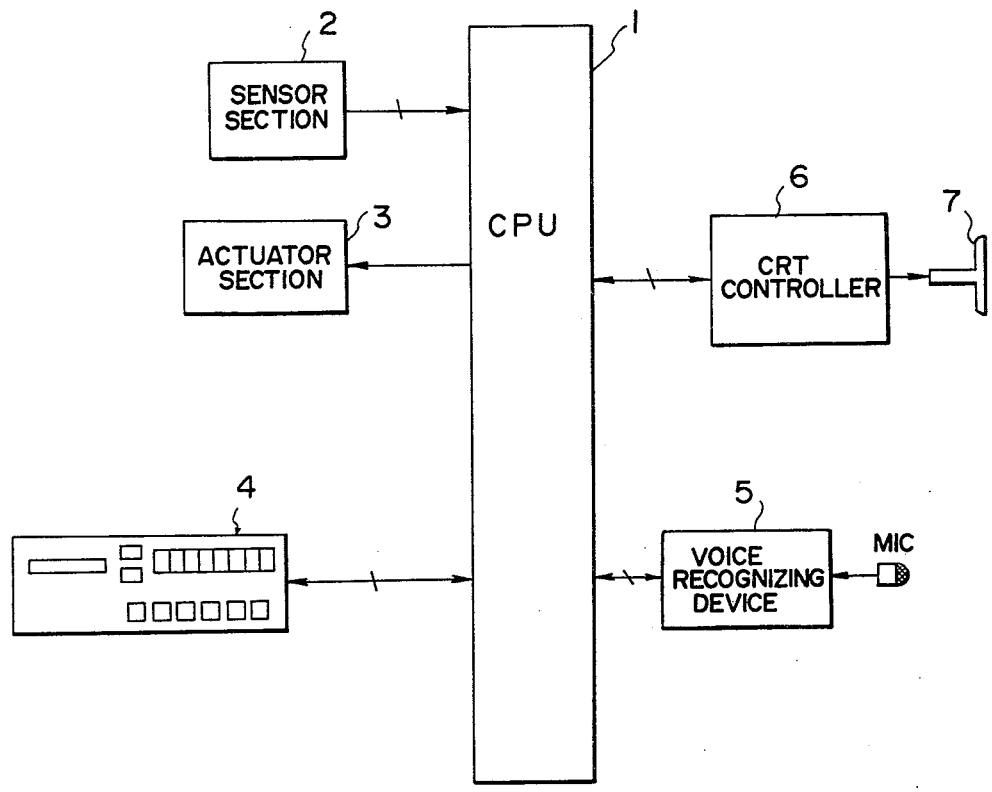
FIG. 1 is a schematic block diagram showing one embodiment of the present invention.

FIG. 1 shows a schematic block diagram showing one embodiment of the present invention.

A central processing unit (hereinafter referred to as "CPU") 1 is connected thereto with a sensor section 2, an actuator section 3, a control unit 4 and a voice recognizing device 5. The sensor section 2 consists of about 10 sensors necessary for the air condition control including a recirculation air sensor, a fresh air sensor, a water temperature sensor and other sensors. The actuator section 3 includes a blower motor for regulating the air flow rate, an air purifier and various valves and relays. Further, the control unit 4 is adapted to receive various commands for air conditioning control by an operator and the data from the magnetic card and indicate the data from CPU 1. The voice recognizing device 5 is adapted to recognize specific terms included in the terms pronounced by the operator and feed the result to CPU 1 as a control signal. Additionally, as necessary, a multi-display device (comprising a cathode ray tube controller 6 and a color cathode ray tube 7, and indicating all data concerning the air conditioning) is connected to CPU 1, and displays a series of data concerning the air conditioning control at once. In this case, also the control unit 4 makes the numerical value indication, but one type of numerical value only.

Figure 3:
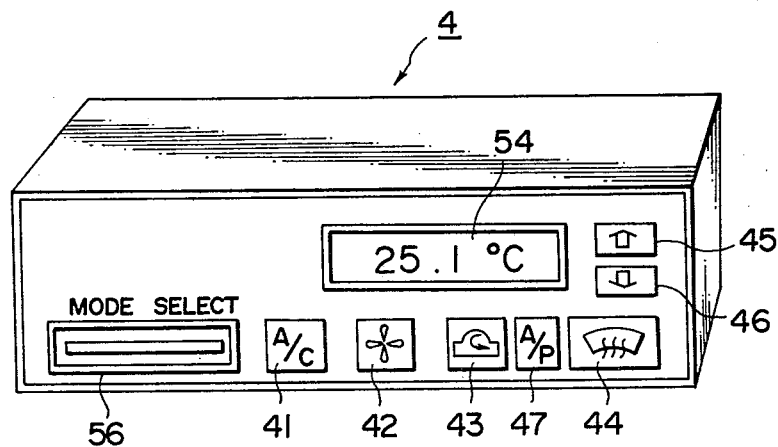
FIG. 3 is an isometric representation of the outer appearance of the control unit.
Figure 2:
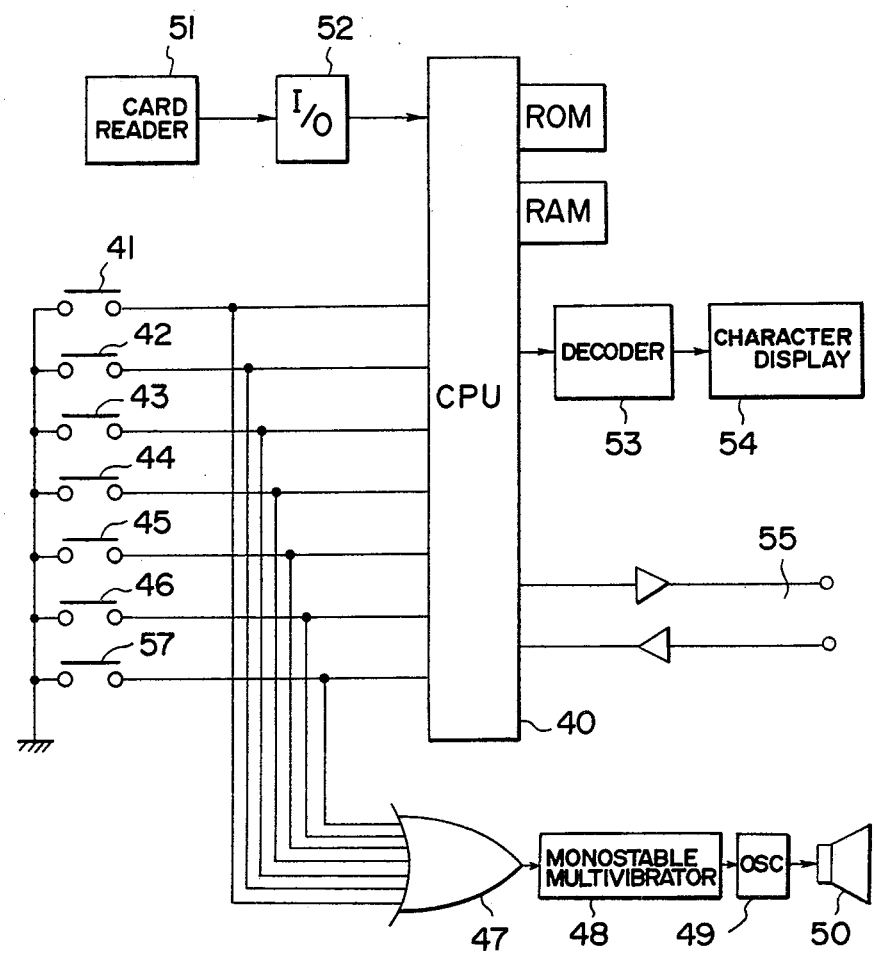
FIG. 2 is a detailed block diagram showing the control unit according to the present invention.

FIG. 2 is a detailed block diagram of the control unit 4 and FIG. 3 shows the outer appearance thereof.

The control unit 4 comprises: an air conditioner (A/C hereinafter) switch 41; a blower switch 42; a recirculation/fresh air switch 43; a defroster switch 44; a temperature raising command switch 45; a temperature lowering command switch 46; and an air purification (A/P hereinafter) switch 57. These switches are connected to CPU 40 (being one chip CPU and having an I/O port and at least memories including ROM and RAM). Respective outputs from switches 41 through 46 are applied to an OR gate 47, and, when one of the switches 41 through 46 is operated, the OR gate 47 emits an output signal to actuate a monostable multivibrator 48. For a period of time during which the monostable multivibrator 48 operates, an oscillator 49 generates audio signals to actuate the speaker 50. The operator can ascertain the operation of the switch by the oscillation signals.

On the other hand, when a magnetic card for specifying one of various control modes to be described hereunder is inserted into a card receipt opening 56 of the control unit 4, a card reader 51 decodes it and the content thus decoded is applied to CPU 40 through an input/output (I/O hereinafter) 52. Additionally, a decoder 53 and a character display device 54 are provided for indicating the temperature and the like. Furthermore, a communication line 55 is provided on CPU 40 for giving data to and receiving data from CPU 1.

Figure 4:
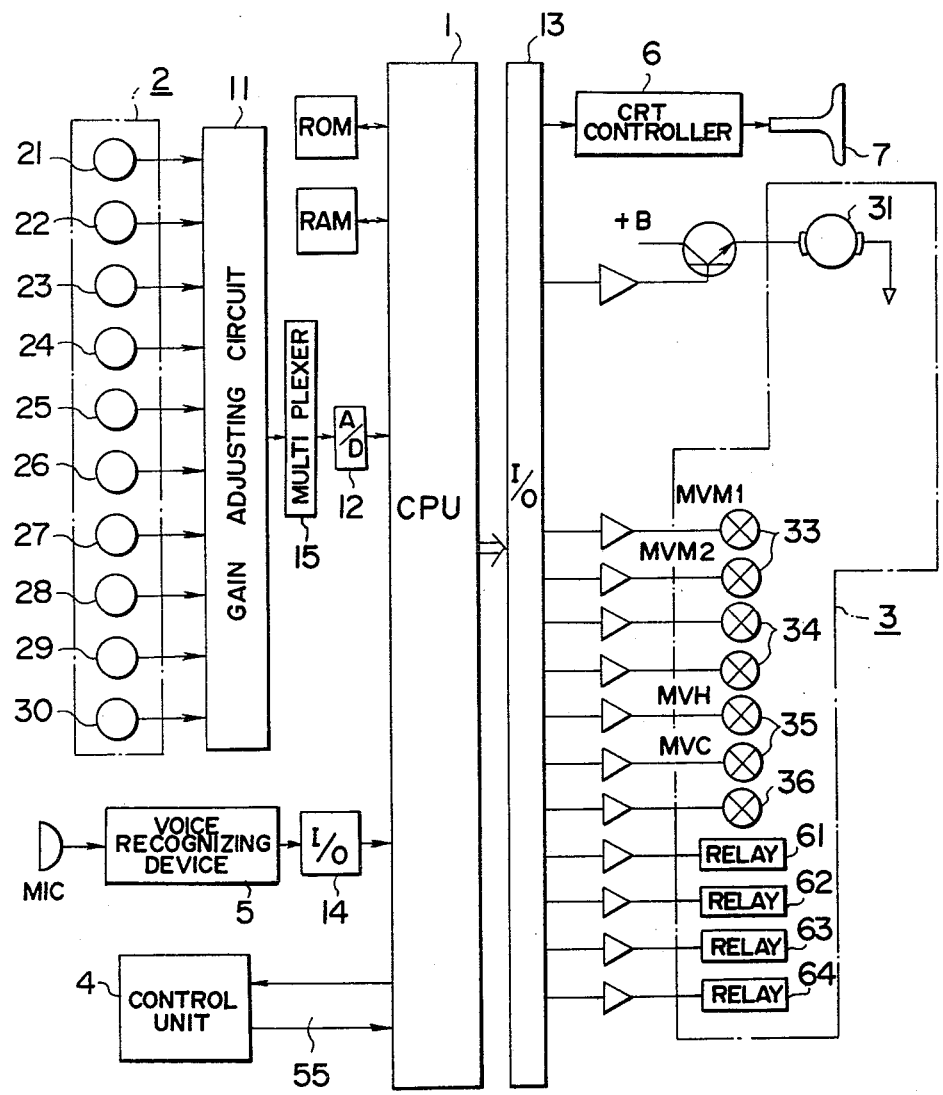
FIG. 4 is a detailed block diagram showing CPU 1 and associated circuitry according to the present invention.

FIG. 4 shows the arrangement around CPU 1. The same reference numerals shown in FIG. 1 are used in FIG. 4 to designate same or similar parts.

The sensor portion 2 includes: a recirculation air temperature sensor 21; a fresh air temperature sensor 22; a water temperature sensor 23; an evaporation outlet temperature sensor 24; a potentiometer 25; a solar radiation sensor 26; a humidity sensor 27; a condensation sensor 28; and an air contamination sensor 29. Since these sensors have different detection sensitivities, output levels and the like, their respective gains are adjusted in a gain adjusting circuit 11, so that analogue levels of the outputs therefrom to be fed to an A/D converter 12 at the succeeding stage can be uniform in amplitude range. The outputs of the respective sensors fed from the gain adjusting circuit 11 are selected via a multiplexer 15 and fed to the A/D converter 12. This selection may be sequential or specified by CPU 1. The A/D converter 12 feeds to CPU 1 a digital signal corresponding to an analogue voltage which is received from multiplexer 15.

The actuator section 3 includes: a blower motor 31; blow-out opening change-over valves 33; a pair of recirculation/fresh air change-over valves 34; A/M damper magnet valves 35; a water valve 36; a heater relay 61; a magnet clutch relay 62; an exhaust high (EX-Hi hereinafter) relay 63; and an air purification control relay 64. In addition, the respective components are driven in this embodiment through respective driver or amplifier circuits which are shown in the drawing, but not specifically designated. Connections therebetween are all controlled by CPU 1 through I/O 13. Similarly, the multidisplay device is driven by CPU 1 through I/O 13.

According to the present invention, the controls under discussion are all effected by CPU 1 which is the center core. The contents of the control functions effected by CPU 1 will be described hereinbelow with reference to the flow charts.

Figure 5:
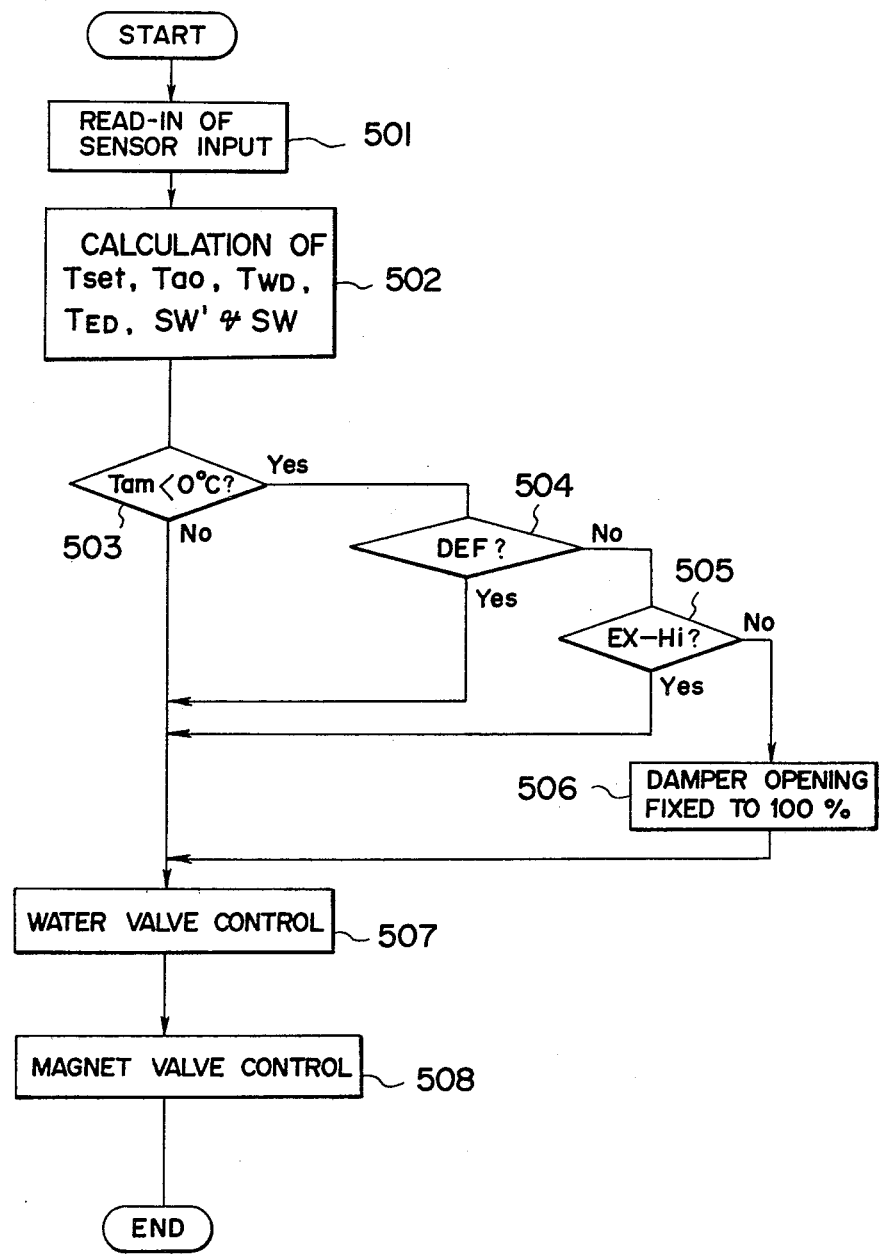
FIG. 5 is a process flow chart showing the basic temperature control, the air mixture damper opening calculation and the damper control according to the present invention.

In the above-mentioned system, (a) the basic temperature control, (b) the A/M damper opening control and (c) the water valve control are processed by CPU 1 in accordance with the flow chart shown in FIG. 5. In Step 501, output signals from the recirculation air temperature sensor 21, the fresh air temperature sensor 22, the water temperature sensor 23 and the solar radiation sensor 26 are read in. In step 502, the recirculation air temperature Tr, the ambient air temperature Tam and the solar radiation valve ST are taken in to correct the room temperature. More specifically, the correction of a set temperature Tset stored as memory data made by the fresh air temperature Tam and the solar radiation value ST is represented by the following equation:

$$Tset = Kset - Ka1(Tam - 10) - Ka2 \cdot ST \tag{1}$$

where Ka1 and Ka2 are constants and the unit of solar radiation value ST is Kcal/m$^2$·min. Subsequently, the required blow-out temperature Tao will be calculated in accordance with the following equation, using Tset in the equation (1):

$$Tao = Kset \cdot Tset - Kam \cdot Tam - Kr \cdot Tr - Ks \cdot ST + C \tag{2}$$

where Kset, Kam, Kr, Ks and C are constants and are 7.2, 0.9, 5.0, 4.3 and 5.0 in value, respectively.

Figure 6:
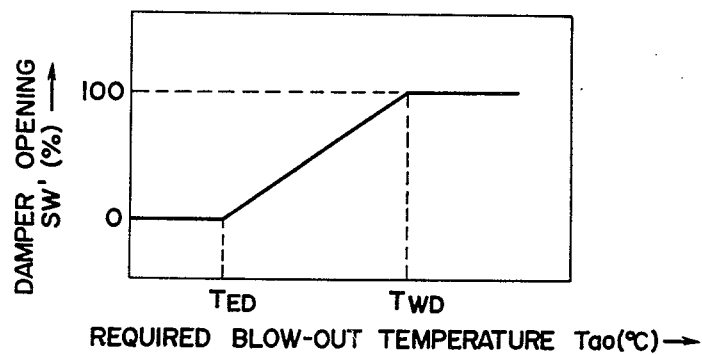
FIG. 6 is the damper opening characteristic curve diagram for the required blow-out temperature.
Figure 7:
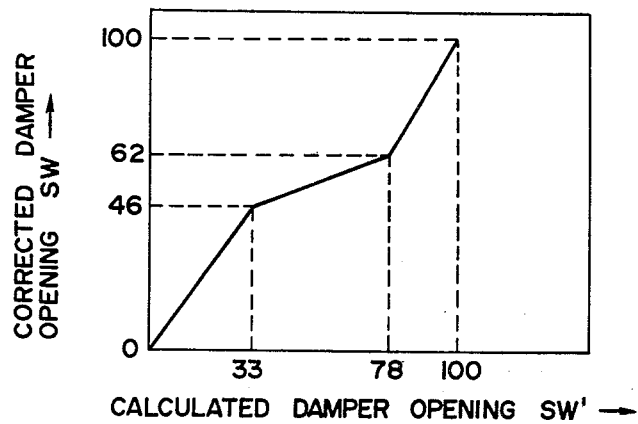
FIG. 7 is a graphical plot of the damper correction function.
Figure 8:
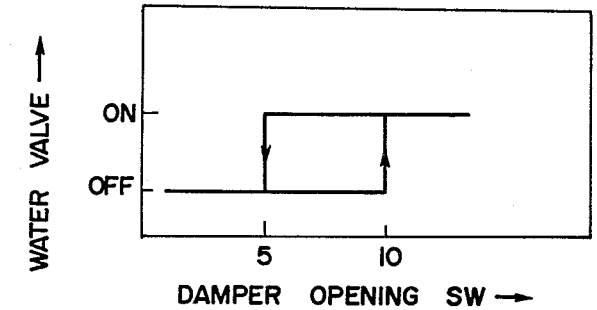
FIG. 8 is a graphical plot of the magnet valve control function.
Figure 9:
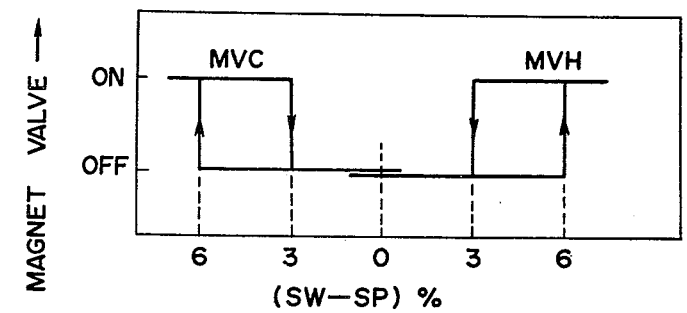
FIG. 9 is a graphical plot of the water valve control function.

Further, the damper opening SW' at the water temperature $T_{WD}$(°C.) corrected is set at an opening of 100%, and the damper opening SW' at the evaporator outlet temperature $T_{ED}$ corrected is set at an opening of 0%, and an A/M damper opening according to the required blow-out temperature Tao(°C.) is obtained as shown in FIG. 6, $T_{WD}$ and $T_{ED}$ in this case will be calculated by the following equation:

$$T_{WD} = (T_W - T_{ED}) \times \phi + T_{ED} \tag{3}$$

$$T_{ED} = T_E + 3 \tag{4}$$

where $T_W$ is the water temperature, $\phi$ is a constant and 0.7 value and $T_E$ is the evaporator outlet temperature. However, when the ambient air temperature Tam is less than 0° C., a defroster (DEF hereinafter) and EX-Hi are off (the processes shown in Steps 503, 504 and 505), the A/M damper opening is fixed at 100% (the highest temperature region) in Step 506. When it is judged in Step 503 that the ambient temperature Tam is not less than 0° C., the process advances to Step 507 where the water valve is controlled. This valve control is controlled in accordance with the A/M damper opening SW as shown in FIG. 8. The water valve WV is ON-OFF operated between the two damper opening degrees thus set. Additionally, the damper opening SW' as shown in FIG. 6 is corrected to be the damper opening SW as shown in FIG. 7. Further, in Step 508, the magnet valves 35 shown in FIG. 4 (MVC and MVH) shown in FIG. 4 are controlled as shown in FIG. 9 so that the damper opening SW obtained in FIG. 7 can coincide with the actual A/M damper opening SP, and, when the both damper openings are coincided with each other, all the process is completed. The compressor control mentioned in Item (d) above operates as follows:

(d) The compressor control

Figure 10:
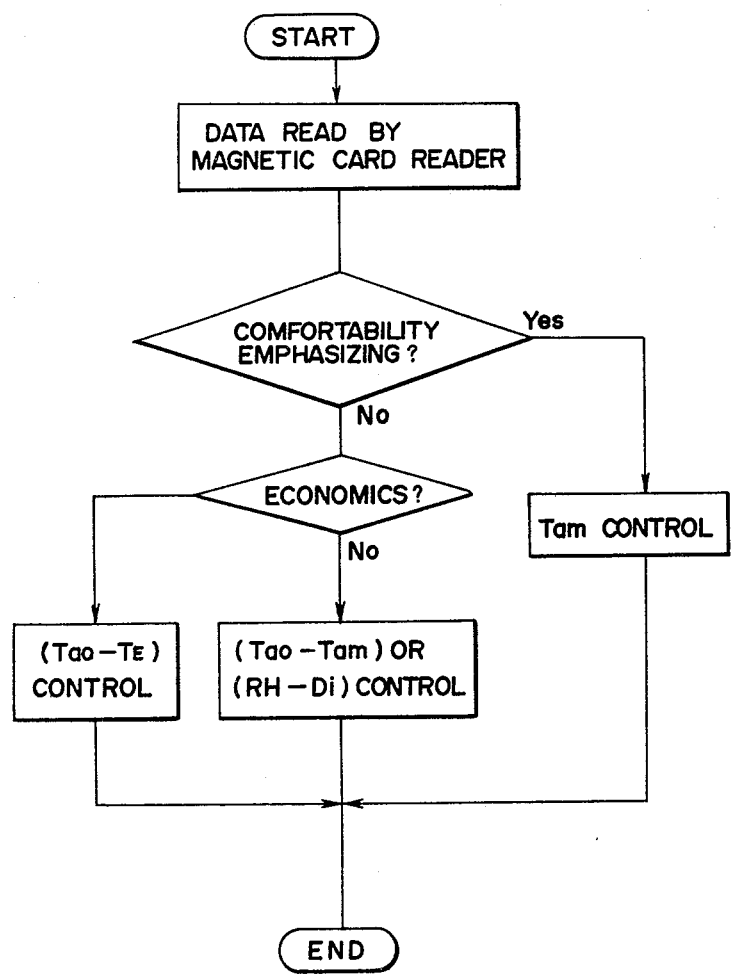
FIG. 10 is a process flow chart of the compressor control according to the present invention.

The compressor control is processed in accordance with the flow chart shown in FIG. 10. The compressor control is stopped when the heater relay 61 is OFF and the air conditioning is OFF (turned OFF by the panel switch and the voice control). The compression control is achieved in accordance with the following four modes:

(i) Control through the ambient air temperature $T_{am}$
(ii) Control through ($T_{ao} - T_{am}$)
(iii) Control through ($T_{ao} - T_E$)
(iv) Control through the relative humidity and the index of resentment.

Any one of these control is performed in accordance with any one of five modes specified by any one of magnetic cards inserted into the control unit 4. The compressor controls corresponding to the respective modes will be shown by the following combinations:

TABLE 1

| Mode Selection by Magnetic Card | Compressor Control |
| --- | --- |
| Normal | (ii) or (iv) |
| Emphasizing comfortability | (i) |
| Emphasizing economy | (iii) |
| Emphasizing quietness | (ii) or (iv) |
| Emphasizing smoke exclusion | (ii) or (iv) |

Figure 11:
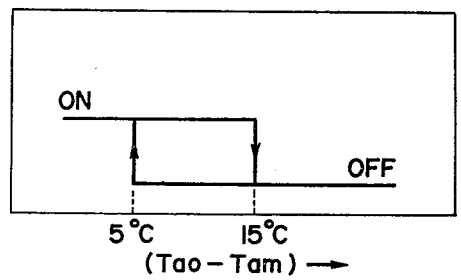
FIG. 11 is a graphical plot of the compressor control through the required blow-out temperature Tao and the ambient temperature Tam.
Figure 12:
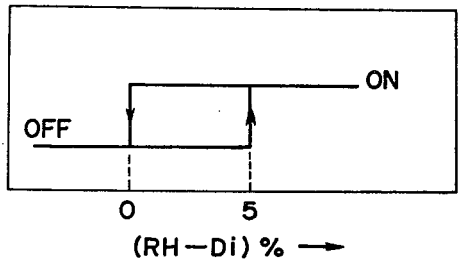
FIG. 12 is a graphical plot of the compressor control through the relative humidity and the index of resentment.

For the normal mode, the quietness emphasizing mode and the smoke exclusion emphasizing mode, the control through ($T_{ao} - T_{am}$) shown in FIG. 11 and the control through the relative humidity and the index of resentment shown in FIG. 12 are performed.

In FIG. 11, when the difference in temperature (the required blow-out temperature minus the ambient air temperature) reaches 15° C., for example, the compressor is stopped (i.e., the magnet clutch relay 62 is turned OFF), and, when the room temperature is elevated and the difference in temperature from the ambient air temperature reaches 5° C., the compressor is driven again. Furthermore, as shown in FIG. 12, when the difference (RH−Di) between the relative humidity (%) and the index of resentment Di(=−8×Tr+272) is within the range of 0 to 5%, the compressor is controlled to be operated ON-OFF.

Figure 13:
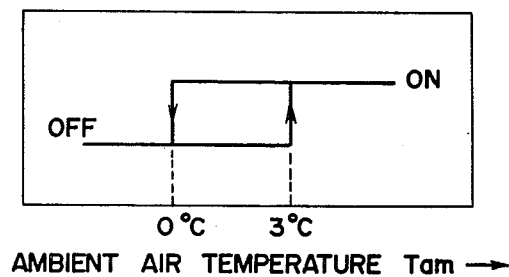
FIG. 13 is a graphical plot of the compressor control through the ambient temperature.
Figure 14:
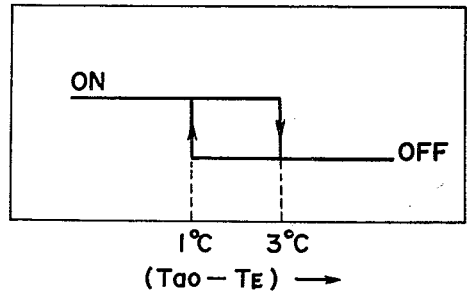
FIG. 14 is a graphical plot of the compressor control through the required blow-out temperature and the post-evaporation temperature.

By adopting the above-described controls, for the economy emphasizing mode, the fresh air can be utilized as the cool air and the recirculation air can be used in large amount by stopping the compressor, economy can be attained without uselessly discharging heat. Previously, the heater and the compressor have been operated ON all the time to control the temperature in such a manner that warm air and cool air are mixed together. In the comfortability emphasizing mode, when the compressor is intermittently controlled, the working sounds may be uncomfortable to the operator. However, according to the present invention, as far as there is no variation in the ambient air temperature, the compressor is in the working conditions, so that quietness can be obtained and the variation in the temperature control can be reduced. In this comfortability emphasizing mode, the control through the ambient air temperature Tam shown in FIG. 13 is performed. Further, in the quietness emphasizing mode, the control through ($T_{ao} - T_E$) in which the blower rotation is low is performed as shown in FIG. 14.

(e) The recirculation/fresh air change-over control

Figure 15:
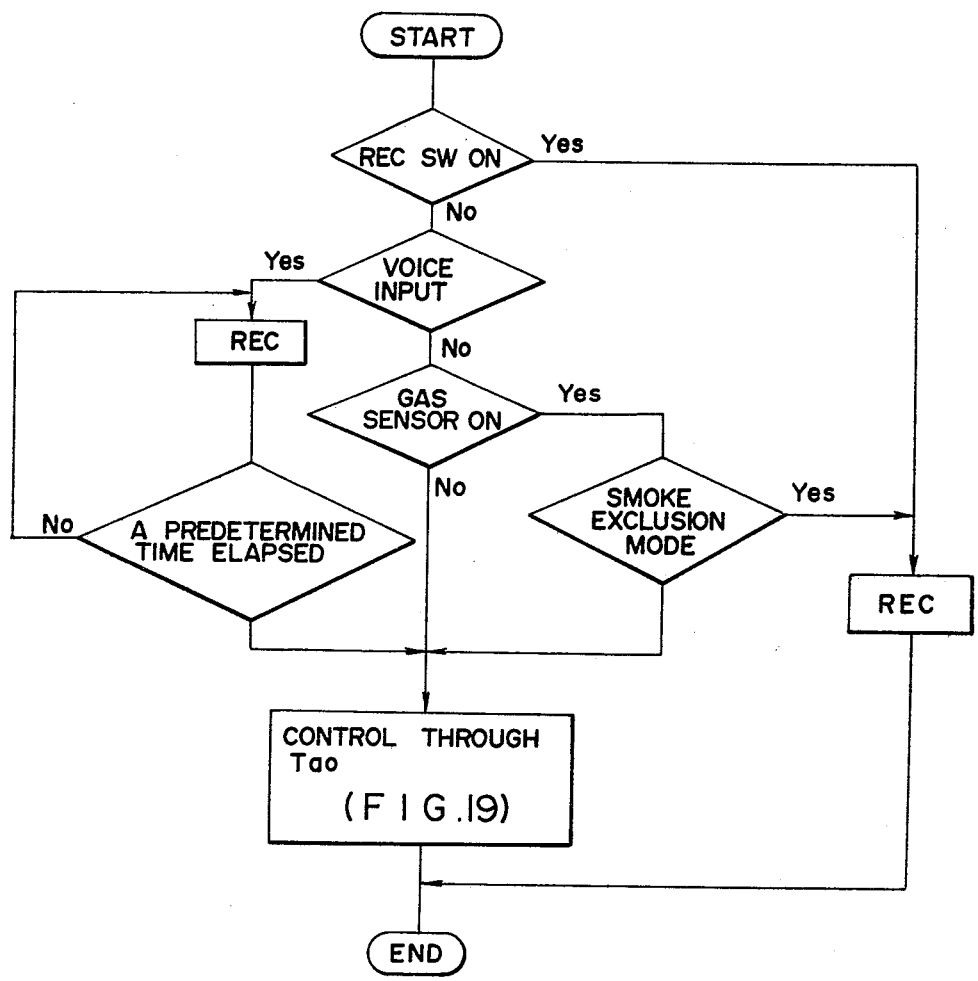
FIG. 15 is a process flow chart showing the recirculation/fresh air change-over control.

This control is processed in accordance with the flow chart shown in FIG. 15. These controls include four control modes, which are assigned with the following priority order.

TABLE 2

| Priority Order | Control Mode |
| --- | --- |
| 1 | Operation of switch "REC" of control panel |
| 2 | Control through voice |
| 3 | Control through gas sensor |
| 4 | Normal control (selection by magnetic card) |

(i) The control by the switch "REC" of the control panel.

Turning ON of the switch "REC" (the recirculation air switch 43) brings about the recirculation air conditions, while, turning OFF of the switch "REC" brings about the fresh air conditions. When this switch is operated, the recirculation/fresh air change-over control by any other method is stopped, and, while the switch is on, a lamp representing the switch is turned ON to indicate that the switch is being used.

(ii) The control through voice comes into the second priority order and functions on condition that the switch "REC" is turned OFF. A microphone (MIC hereinafter) receives a pronunciation of "REC" (recirculation) made by the operator and feeds it to a voice recognizing device 5. The voice recognizing device 5 recognizes a voice signal thus received and feeds a digital signal corresponding the "REC" to CPU 1 through the I/O circuit 14. CPU 1 drives the valve 34 to bring about the recirculation air conditions. The transfer to the fresh air conditions is processed such that the recirculation/fresh air mixed conditions are brought about by a timer programmed by a software of the computer in 6 minutes, and then the control is performed to return to the fresh air conditions in 6 minutes, for example.

(iii) The control through the gas sensor (the air contamination sensor 30) comes into the third priority order and functions when the switch 43 is not operated and no voice input is present. This control is effected only when the smoke exclusion emphasizing mode is specified by the magnetic card. The transfer from the fresh air (FRS) to the recirculation air (REC) is performed at the same time as the gas sensor is turned ON.

Figure 16:
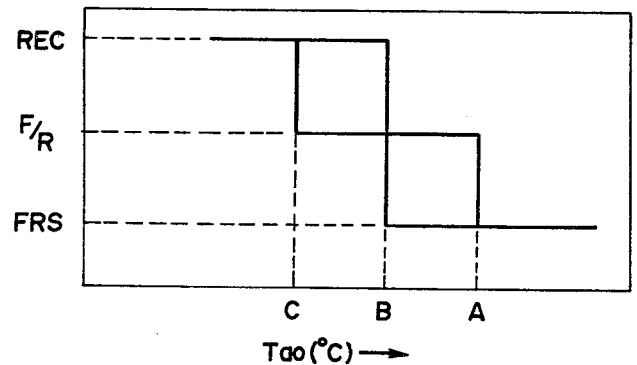
FIG. 16 is a graphical plot of the recirculation/fresh air change-over control through the normal control mode.
Figure 17:
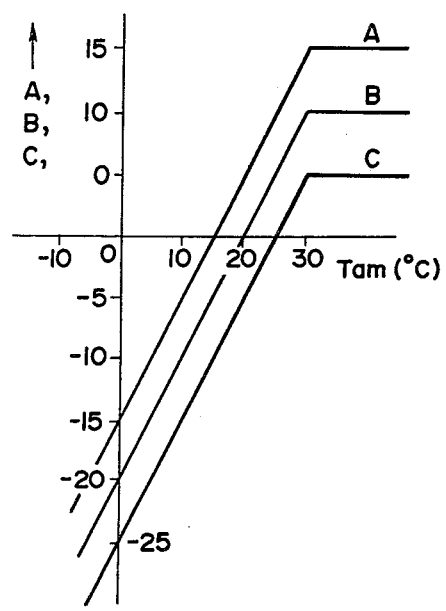
FIG. 17 is a graphical plot of the change in the temperature setting.

(iv) The normal control comes into the fourth priority order and functions as shown in FIG. 16. Points A, B and C shown in FIG. 16 are calculated from FIG. 17, and the respective values thereof may be changed as shown below. These changes are performed such that the temperature command switch 45 or 46 of the control unit 4 is operated to set the respective values to the desired values, with the indication of the indicating portion 54 being ascertained.

(1) In the economy emphasizing mode $$A' = A + 10$$

$$B' = B + 10$$

$$C' = C + 10$$

(2) In the smoke exclusion emphasizing mode $$A'' = A - 10$$

$$B'' = B - 10$$

$C' = C - 10$ (3) In any mode other than the above $A''' = A$, $B''' = B$ and $C''' = C$ These control modes (1) through (3) are to be specified by the above-described magnetic cards (The magnetic cards are prepared for the respective emphasizing modes and the user selects any one of the magnetic cards and insert it into the control unit 4), and the contents of the controls according to the selected modes have been shown in Table 1.

(f) The blow-out opening control

The blow-out opening control is processed in accordance with the flow chart shown in FIG. 18, and has four modes of control, which are assigned thereto with the priority orders shown in FIG. 3. The objects for control in this case are the blow-out change-over valves 33 shown in FIG. 4.

TABLE 3

| Priority Order | Control Mode |
| --- | --- |
| 1 | (i) Control through "DEF" switch of control unit |
| 2 | (ii) Control through voice |
| 3 | (iii) Control through condensation sensor |
| 4 | (iv) Normal control |

(i) The control through the "DEF" switch of the control unit.

When the "DEF" switch 44 of the control unit 4 is turned ON, CPU 1 drives the blow-out opening change-over valve 33, whereby the defroster "DEF" is operated only while the switch 44 is ON.

(ii) The control through the voice is effected when the operator pronounces the voice "DEF". The voice recognizing device 5 feeds a digital signal corresponding to the voice "DEF" to CPU 1 through the I/O circuit 14, whereby the defrosting conditions are brought about for a predetermined period of time (6 min. for example).

(iii) The control through the condensation sensor is performed such that the transfer from some other conditions to the defrosting conditions is effected by the operation (ON) of the condensation sensor 29, and, even after the sensor 29 is turned OFF, the defrosting conditions are maintained for a predetermined period of time (2 min. for example).

Figure 19:
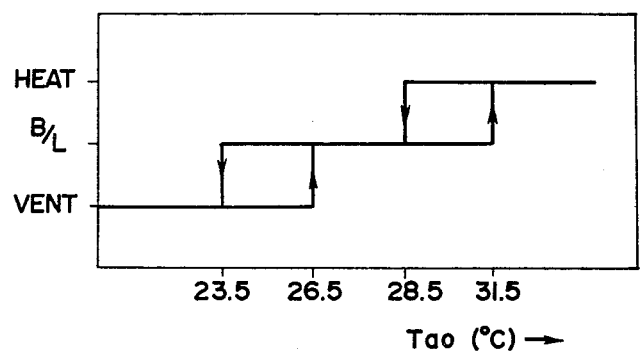
FIG. 19 is a graphical plot of the blow-out opening control by the normal control mode.

(iv) When the above-described modes (i) through (iii) do not function, the transfer is made to the normal control of the fourth priority order. This normal control has the contents of control shown in Table 1 and specified by the magnetic card, and FIG. 19 illustrates the conditions of control.

In addition, Table 4 shows the conditions of the actuator in the respective modes.

TABLE 4

| Magnet valve | Conditions of blow-out opening | | | |
| --- | --- | --- | --- | --- |
|  | VENT | HEAT | B/L | DEF |
| MVM 1 | OFF | ON | OFF | ON |
| MVM 2 | OFF | ON | ON | OFF |

(g) The air flow rate control

The air flow rate control normally has two control modes including (i) a normal control and (ii) a delayed control. The control mode shown in Table 1 and specified by the magnetic card is applied to this normal control. In this case, the mode shown in Table 1 is divided into the following three patterns for use.

Figure 20:
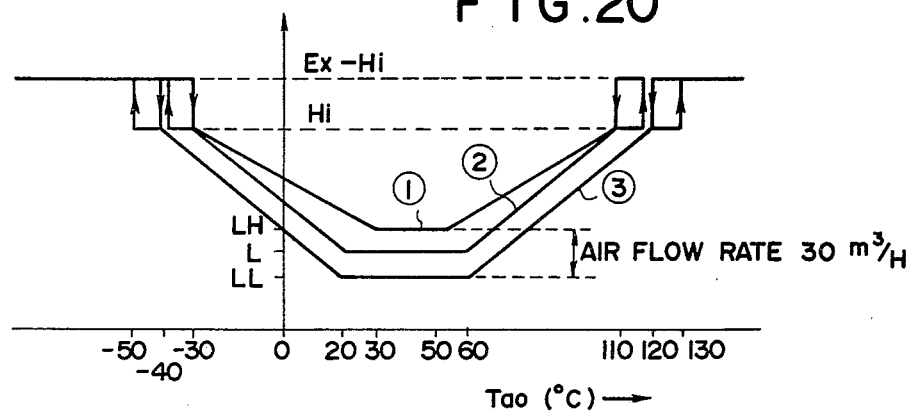
FIG. 20 is the control pattern characteristics curve diagram used for the air flow rate control.
Figure 21:
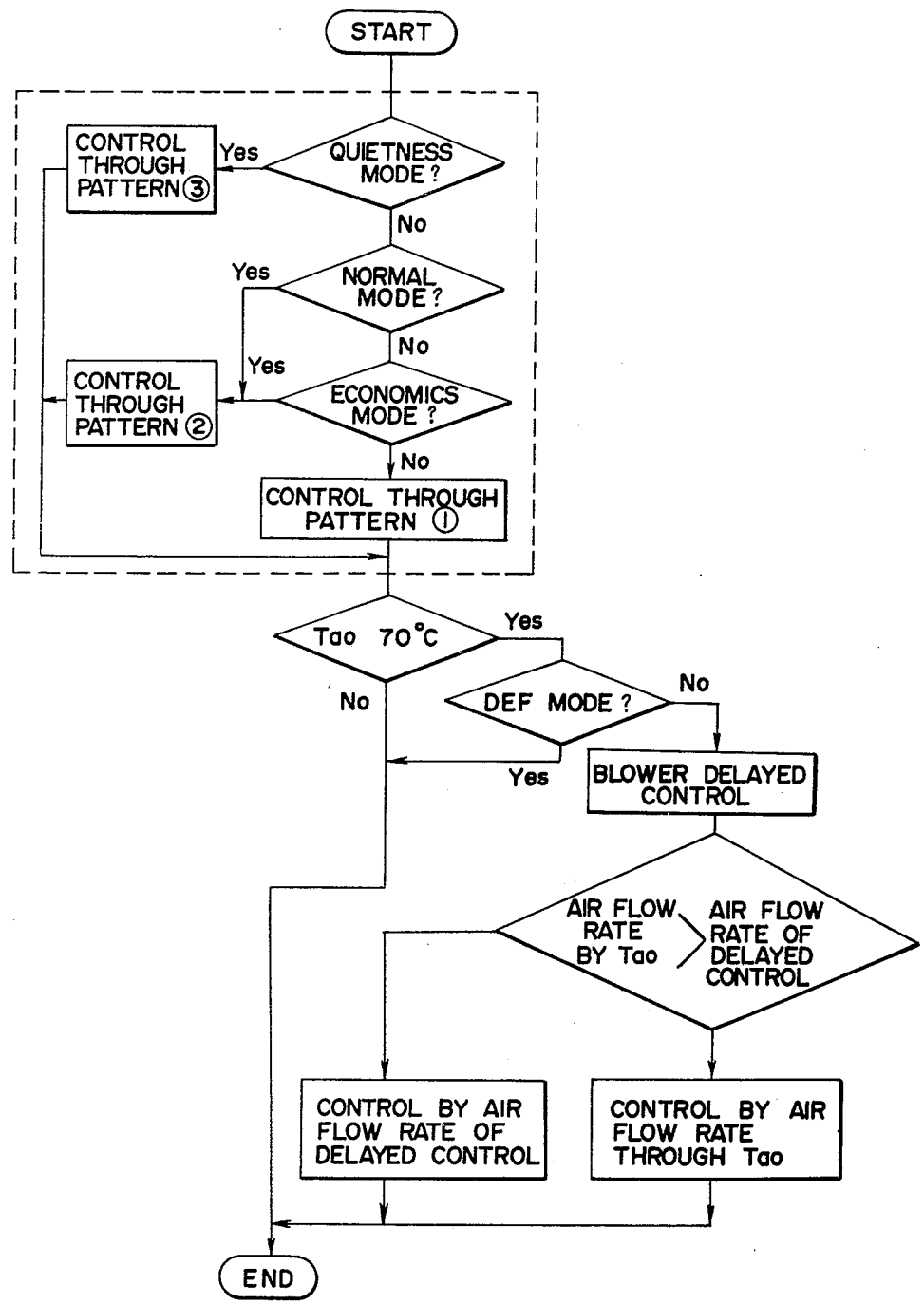
FIG. 21 is a process flow chart of the air flow rate control.
Figure 22:
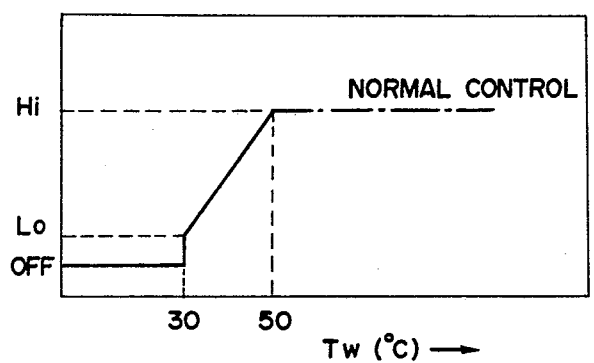
FIG. 22 is a graphical plot of the control when the required blow-out temperature exceeds 70° C.

Pattern (1): the comfortability emphasizing mode and the smoke exclusion emphasizing mode Pattern (2): the normal mode and the economy emphasizing mode Pattern (3): the quietness emphasizing mode The characteristics of these patterns shown to the required blow-out temperature Tao are indicated in FIG. 20. The patterns (1) through (3) shown in FIG. 20 are processed as shown in FIG. 21. More specifically, in the quietness emphasizing mode, the blower motor 31 is controlled so that the characteristics of the pattern (3) shown in FIG. 20 can be obtained, in the normal mode, the blower motor 31 is controlled so that the characteristics of the pattern (2) can be obtained, and, in the economy emphasizing mode, the blower motor 31 is controlled so that the characteristics of the pattern (1) can be obtained. The above-described controls are all included in the region of the normal control through Tao (a portion indicated by broken lines in FIG. 21). Furthermore, when, in the mode other than DEF mode and Tao > 70° C., the air flow rate is varied as shown in FIG. 22 by the water temperature (detected by the water temperature sensor 23). In FIG. 22, a solid line indicates the scope of the delayed control and a one-dot-chain line indicates the scope of the normal control. Within the scope of the delayed control of the blower, either the delayed control or the air flow rate control through Tao is selected depending upon whether the air flow rate by the delayed control to the air flow rate by the control through Tao is high or low.

(h) The condensation control

The condensation control is used for preventing windows from becoming cloudy due to the condensation on the surfaces of a front and a rear windows. Table 5 shows the temperature change-over points for this control, which are detected by the condensation sensors 28 and 29 shown in FIG. 4.

TABLE 5

| Condensation sensor | Ambient air temperature | | |
| --- | --- | --- | --- |
|  | 0° C. | 20° C. or less | −10° C. or less |
| Front side one ON Rear side one ON | Compressor ON Same as above | Air flow rate risen by 10% Defogger ON and air flow rate risen by 10% | DEF mode |

Figure 23:
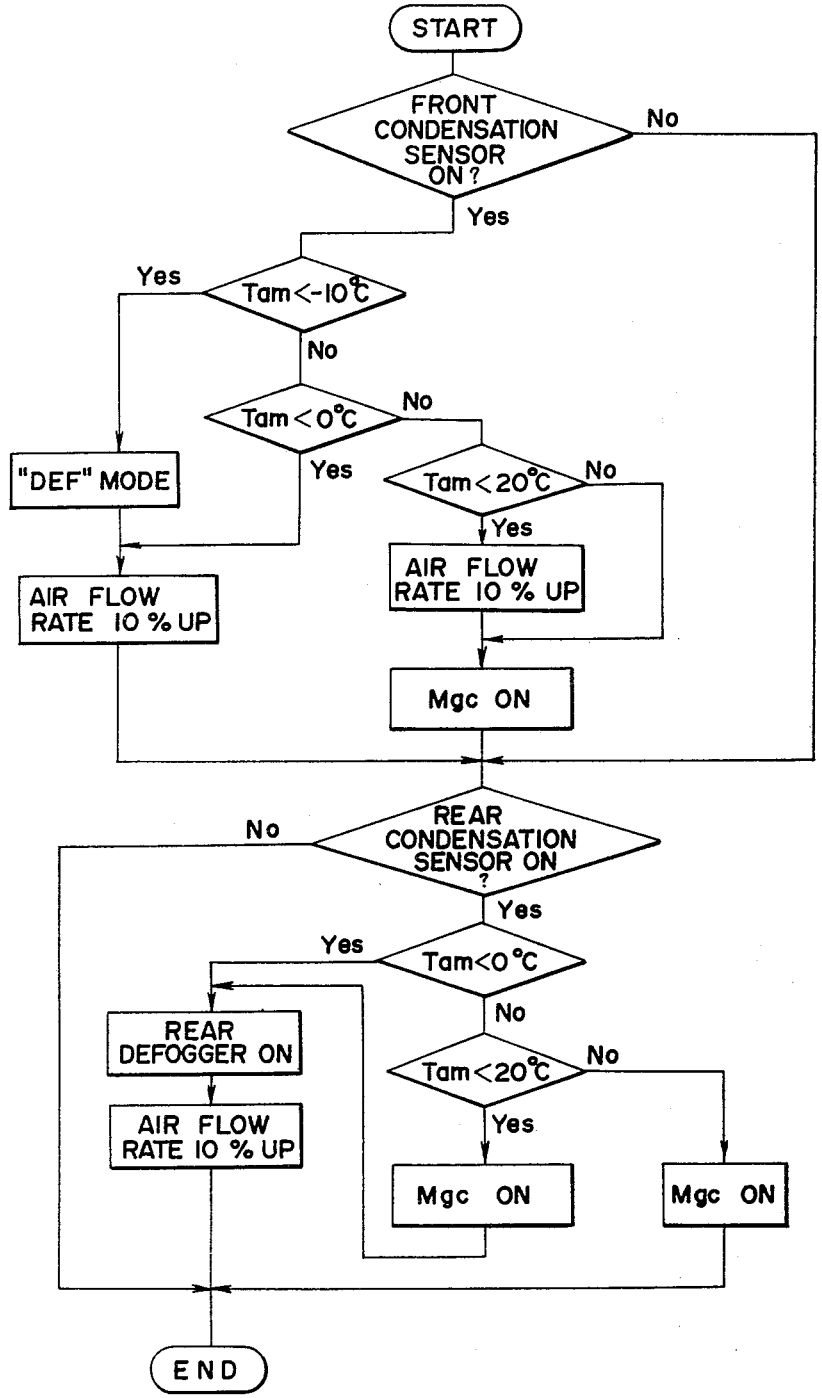
FIG. 23 is a process flow chart of the condensation prevention control.

In this case, the condensation sensors 28 and 29 have such characteristics as to be turned ON at a humidity of 90% and turned OFF at a humidity of 85%. In addition, in the DEF mode which functions when the ambient air temperature of −10° C. or less, even if the humidity is lowered to 85% or less, the DEF mode is maintained for 2 min. for example, and thereafter, the normal mode is brought about again. FIG. 23 shows the process flow chart in the condensation control.

(i) The air purification control (air purification)

The air purification control is applicable to a case where air in the room is contaminated by smoking and the like, and has the following three modes.

(i-1) The control by the "A/P" switch 57 of the control panel (Priority No. 1)

Firstly judgement is made if the front condensation sensor 28 is ON or OFF, when it is ON, judgement of Tam is made, and when it is OFF, judgement of the rear condensation sensor 29 is made. If Tam is −10° C. or less, transfer to the DEF control is made and the control of raising the air flow rate by 10% is effected. If Tam> −10° C. and Tam<0° C., only the control of raising the air flow rate by 10% is effected with no transfer to the DEF mode being made. Further, if Tam> −10° C. and Tam>0° C., the control of raising the air flow rate by 10% is effected when Tam>20° C., and the compressor (Mgc hereinafter) ON control is effected. Upon completion of the above-described processes, judgement is made if the rear condensation sensor 29 is ON or OFF. If the rear condensation sensor 29 is OFF, all the processes are completed. When the rear condensation sensor 29 is ON, if Tam<0° C., than a rear defogger lamp is turned ON and the control of raising the air flow rate by 10% is effected. When Tam>0° C. and Tam<20° C., the compressor is turned ON, the rear defogger lamp is turned ON, and further, the control of raising the air flow rate by 10% is effected. Furthermore, when Tam>20° C., only the compressor is controlled to be turned ON.

Description will now be given of the air purification (A/P hereinafter) control.

(i-2) The control through the voice (Priority No. 2)
(i-3) The control by the smoke sensor (Priority No. 3)

Figure 24:
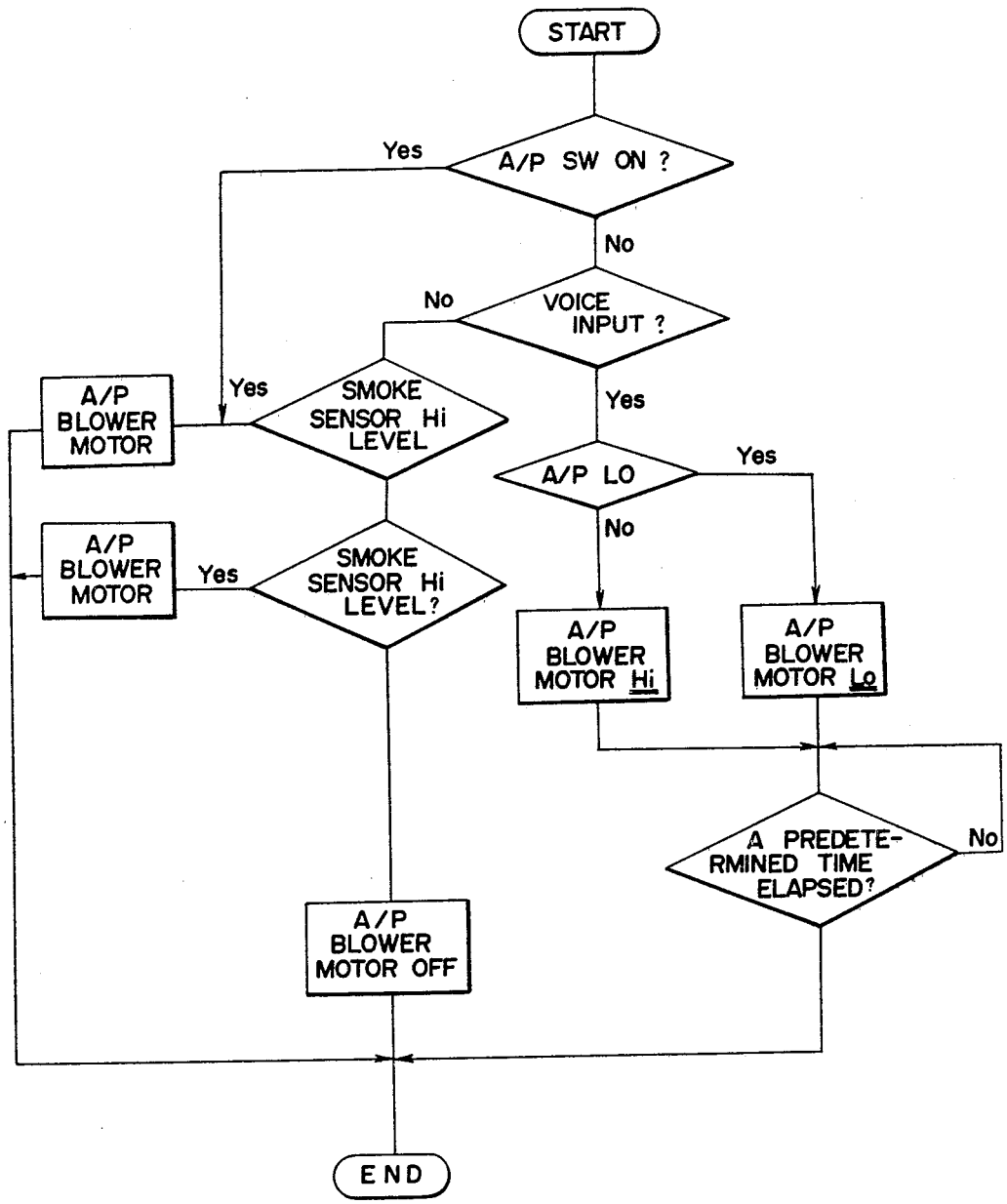
FIG. 24 is a process flow chart showing the air purification control.

FIG. 24 is a flow chart showing this case. In the control mode of (i-1), when the "A/P" switch 57 of the control unit 4 is pressed, the air purification is started, and, when the "A/P" switch 57 is pressed again, the air purification is stopped. In this case, upon turning ON of an ignition switch, an A/P automatic mode is brought about, and, in this automatic mode, a lamp of a panel of the "A/P" switch 57 is turned ON.

In the control through the voice mentioned in Item (i-2), the A/P automatic mode is normally brought about similarly to the case of the control by the A/P switch. When the user pronounces the voice "Air-puri low", the air purification conditions are transferred from a Hi (High) mode or OFF conditions to a Lo (Low) mode. Furthermore, when the user pronounces the voice "Air-puri high", the air purification conditions are transferred from some other mode to the Hi mode. The duration of this voice control mode is controlled by a timer of the software of CPU 1, and the mode is maintained for 5 minutes for example. In this case, the voice recognizing device 5 is utilized and a component controlled thereby is an air purification controlling relay 64.

The control by the smoke sensor mentioned in Item (i-3) is adapted to function without any voice input, optically detect the conditions of smoke by the air contamination sensor 29 and effect controls of three stages (Hi, Lo and OFF) in accordance with the coefficient of beam attenuation. For example, the coefficient of beam attenuation is associated with the contents of controls as shown in FIG. 6.

TABLE 6

| Coefficient of beam attenuation (%/m) | Air purification mode |
| --- | --- |
| 2 | Lo → OFF |
| 3 | OFF → Lo |
| 5 | Hi → Lo |
| 6 | Lo → Hi |

(j) The precontrol

This control performs the following controls when the "A/C" switch of the control unit 4 is turned OFF or "Air conditioner OFF" is fed by the voice.
(j-1) The heater relay 61 and the magnet clutch relay 62 are turned OFF.
(j-2) The A/M damper control, the water valve control, the recirculation/fresh air change-over control and the blow-out opening control are normally effected.

As has been detailedly described hereinabove, various instructions and control modes concerning the air conditioning control can be given through the magnetic cards and voice, so that the manual operations by the user can be relieved to a considerable extent, and moreover, the various environmental mode controls such as the economy emphasizing control which have been performed by the manual operations in accordance with the judgement of the user can be automatically carried out.

The foregoing description has illustrated the example where the magnetic card is used for specifying the mode, however, the magnetic card may be replaced by a magnetic tape (a cassette tape and the like for example). In addition, one CPU for decoding several data has been provided in the control unit 4, however, the CPU can be expanded so as to process all the external component and data.

It should be apparent to one skilled in the art that the above-described embodiments are merely illustrative of a few of many possible specific embodiments of the present invention. Numerous and varied other arrangements can be readily devised by those skilled in the art without departing from the spirit and scope of the invention.

What is claimed is:

1. An air conditioner control system comprising:
   a memory medium for storing control modes in which the comfortability of a vehicle is taken into consideration; and
   a central process unit having a control program corresponding to at least one of a plurality of controls including a compressor control, a recirculation/fresh air change-over control, a blow-out opening change-over control, an air flow rate control, a condensation control and an air purification control and performing said control program in response to outputs from various sensors, external instructions, and data from said memory medium, said sensors including at least a condensation sensor for detecting humidity and a temperature sensor for detecting ambient air temperature, whereby said condensation control performs a regulation of a blow-out air flow rate and a control of a rear defogger and a compresor in response to output signals from said condensation sensor and said temperature sensor.

2. An air conditioner control system as set forth in claim 1, wherein said memory medium is a magnetic card.

3. An air conditioner control system as set forth in claim 1, wherein said memory medium is a magnetic tape.

4. An air conditioner control system comprising:
   a memory medium for storing control modes in which the comfortability of a vehicle is taken into consideration; and
   a central process unit having a control program corresponding to at least one of a plurality of controls including a compressor control, a recirculation/- fresh air change-over control, a blow-out opening change-over control, an air flow rate control, a condensation control and an air purification control, and performing said control program in response to outputs from various sensors, external instructions, and data from said memory medium, said sensors including at least an air contamination sensor, whereby a fresh air condition is changed into a recirculation air condition, and vice versa, in response to a signal from said air contamination sensor.

5. An air conditioner control system comprising:
a memory medium for storing control modes in which the comfortability of a vehicle is taken into consideration; and
a central process unit having a control program corresponding to at least one of a plurality of controls including a compressor control, a recirculation/fresh air change-over control, a blow-out opening change-over control, an air flow rate control, a condensation control and an air purification control, and performing said control program in response to outputs from various sensors, external instructions, and data from said memory medium, said sensors including at least a condensation sensor for detecting humidity, whereby a defrosting condition is changed into other conditions, and vice versa, in response to a signal from said condensation sensor under said blow-out opening change-over control.

6. An air conditioner control system comprising:
a memory medium for storing control modes in which the comfortability of a vehicle is taken into consideration; and
a central process unit having a control program corresponding to at least one of a plurality of controls including a compressor control, a recirculation/fresh air change-over control, a blow-out opening change-over control, an air flow rate control, a condensation control and an air purification control, and performing said control program in response to outputs from various sensors, external instructions, and data from said memory medium, said recirculation/fresh air change-over control, said blow-out opening change-over control and said air purification control being arranged in an order of priority from the control by manual operations, the control through the sensors and the control through the data from said memory medium.

7. An air conditioner control system comprising:
a memory medium for storing control modes in which the comfortability of a vehicle is taken into consideration; and
a central process unit having a control program corresponding to at least one of a plurality of controls including a compressor control, a recirculation/fresh air change-over control, a blow-out opening change-over control, an air flow rate control, a condensation control and an air purification control, and performing said control program in response to outputs from various sensors, external instructions, and data from said memory medium, said control modes stored in said memory medium including a normal mode, a comfortability emphasizing mode, an economy emphasizing mode, a quietness emphasizing mode and a smoke exclusion emphasizing mode.

8. An air conditioner control system as set forth in claim 7, wherein each of said five modes is divided into a plurality of control patterns corresponding to a required blow-out temperature, and a blow-out air flow rate is controlled as a control value in accordance with said control pattern.

9. An air conditioner control system as set forth in claim 7, wherein said normal mode, said quietness emphasizing mode and said smoke exclusion emphasizing mode are controlled in accordance with a selected one of said required blow-out temperature less an ambient air temperature and a relative humidity less an index of resentment.

10. An air conditioner control system as set forth in claim 7, wherein said comfortability emphasizing mode is controlled in accordance with an ambient air temperature.

11. An air conditioner control system as set forth in claim 7, wherein said economy emphasizing mode is controlled in accordance with a required blow-out temperature less an evaporator outlet temperature.

* * * * *